United States Patent [19]

Kalchauer et al.

[11] Patent Number: 4,952,658

[45] Date of Patent: Aug. 28, 1990

[54] PROCESS FOR PREPARING ORGANOPOLYSILANES

[75] Inventors: Wilfried Kalchauer; Bernd Pachaly; Norbert Zeller, all of Burghausen, Fed. Rep. of Germany

[73] Assignee: Wacker-Chemie GmbH, Munich, Fed. Rep. of Germany

[21] Appl. No.: 312,275

[22] Filed: Feb. 21, 1989

[30] Foreign Application Priority Data

Apr. 7, 1988 [DE] Fed. Rep. of Germany ....... 3811567

[51] Int. Cl.$^5$ .............................................. C08G 77/04
[52] U.S. Cl. ........................................ 528/34; 528/10; 528/33; 556/430; 525/474
[58] Field of Search .................... 556/430; 528/10, 33, 528/34; 525/474

[56] References Cited

U.S. PATENT DOCUMENTS 4,537,942  8/1985  Brown-Wensley et al. ........ 556/430
4,552,973  11/1985  Feldner et al. ..................... 556/469

*Primary Examiner*—Melvyn I. Marquis

[57] ABSTRACT

The invention relates to a process for preparing organopolysilanes which comprises reacting an organosilicon compound containing Si-Si bonds and containing at least one radical of the formula

—OR$^2$ where R$^2$ represents hydrogen or an alkyl radical, with boric acid.

16 Claims, No Drawings

PROCESS FOR PREPARING ORGANOPOLYSILANES

The present invention relates to organopolysilanes and more particularly to a process for preparing organopolysilanes which may be used for preparing SiC-containing fibers and ceramic materials.

Background of the Invention

Organosilicon compounds containing Si–Si bonds are described, for example, in U.S. Pat. No. Re. 31,447 to Baney et al, in which a polysilane is reacted under anhydrous conditions with a reagent selected from carbinols, alcoholates and alkyl orthoformates at a temperature of from 0° to 100° C. in a suitable solvent. The polysilanes contain from 0 to 60 mole percent $(CH_3)_2Si=$ units and 40 to 100 mole percent $CH_3Si\equiv$ units, wherein there is also bonded to the silicon atoms other silicon atoms and radicals having the formula RO—, wherein R is an alkyl radical having from 1 to 4 carbon atoms or phenyl and essentially all the remaining bonds on the silicon are attached to chlorine or bromine atoms.

U.S. Pat. No. 4,667,046 to Frey et al describes the preparation of organopolysilanes which comprises reacting at least one disilane of the formula $$R_2R^1Si_2(OCH_3)_3,$$

which may optionally be mixed with a compound of the formula $R_2Si_2(OCH_3)_4$, with at least one compound of the formula $$R_2R^2SiH$$

in the presence of at least one compound of the formula $$MOR,$$

where R represents monovalent alkyl, alkenyl or aryl groups, $R^1$ represents monovalent alkyl groups, $R^2$ represents a methoxy group or R and M represents an alkali metal.

Organosilicon compounds containing Si—Si bonds are also described by W. H. Attwell et al; J. Organomet. Chem. 5 (1966) 594 and 18 (1969) 69.

It is, therefore, an object of the present invention to provide a process for preparing organopolysilanes. Another object of the present invention is to provide a process for preparing organopolysilanes which are free of Si-bonded halogen atoms. Still another object of the present invention is to provide a process for preparing organopolysilanes from compounds which are free of halogen atoms. A further object of the present invention is to provide a process for preparing organopolysilanes containing functional organic groups, and thereby control the chemical and physical properties of the resultant organopolysilanes.

SUMMARY OF THE INVENTION

The foregoing objects and others which will become apparent from the following description are accomplished in accordance with this invention, generally speaking, by providing a process for preparing organopolysilanes which comprises reacting an organosilicon compound containing Si—Si bonds and containing at least one radical of the formula $$—OR^2$$

where $R^2$ represents hydrogen or an alkyl radical, in the presence of boric acid.

DESCRIPTION OF THE INVENTION

The reaction of the organosilicon compounds containing Si—Si bonds and containing at least one radical of the formula $$—OR^2$$

where $R^2$ is the same as above, with boric acid preferably takes place at temperatures in the range of from 20 to 250° C. and more preferably at temperatures of from 110° to 180° C.

Boric acid is a well known, large-scale industrial product. The boric acid employed in the process of this invention preferably has a purity of from 90 to 100 percent by weight and more preferably a purity of from 99 to 100 percent by weight.

In the process of this invention 0.1 to 20 percent by weight of boric acid, and more preferably from 1 to 10 percent by weight, based on the weight of the organosilicon compound containing Si—Si bonds, is employed.

The preferred organosilicon compounds containing Si—Si bonds employed in the process are represented by the general formula

(I)

where $R^1$, $R^3$, $R^4$ and $R^5$, which may be the same or different represent hydrogen or an alkyl, alkenyl, aryl or alkoxy radical, $R^2$ represents hydrogen or an alkyl radical, x is in the range of from 0.1 to 0.9, y is in the range of from 0.01 to 0.5, z is in the range of from 0 to 0.5 and n is in the range of from 2 to 1,000, with the proviso that the sum of $(x+y+z)$ is 1.

Preferred alkyl, alkenyl, aryl and alkoxy radicals have from 1 to 6 carbon atoms.

Examples of alkyl radicals are the methyl and ethyl radicals, examples of alkenyl radicals are the vinyl and allyl radicals, an example of an aryl radical is the phenyl radical, and examples of alkoxy radicals are the methoxy, ethoxy and propoxy radicals. Due to their availability, the preferred radicals are the methyl, methoxy and ethoxy radicals.

Preferred organosilicon compounds containing Si—Si bonds are those which are represented by the general formula $$[(SiMe_2)_a(MeSiOR^6)_b(SiMe)_c]_n \quad (II)$$

where a:c is in the range of from 5:3 to 3:5, Me:$R^6$O is in the range of from 8:1 to 25:1, and n is in the range of from 2 to 50, the sum of $(a+b+c)$ is 1 and $R^6$ represents a methyl or ethyl radical.

In a preferred embodiment of the process of this invention, organosilicon compounds of the general formula

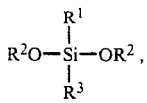

$R^2$ and $R^3$ are the same as above, are added to the compounds represented by formula II above.

The organosilicon compounds of formula III are commercially available products or can easily be prepared by simple processes, such as described in W. Noll, Chemistry and Technology of Silicones, Academic Press, Orlando, 1968.

The organosilicon compounds of formula III may be employed in an amount of from 0.1 to 40 percent by weight and more preferably from 1 to 10 percent by weight of formula II.

Examples of compounds represented by formula III are dimethoxydimethylsilane, dimethoxymethylvinylsilane, dimethoxymethylphenylsilane, dimethoxyethylmethylsilane, diethoxydimethylsilane, diethoxymethylethylsilane, diethoxymethylphenylsilane and diethoxymethylvinylsilane.

In particular, dimethoxymethylvinylsilane and dimethoxymethylphenylsilane are preferably employed.

The process of this invention is preferably carried out in inert organic solvents, such as aromatic or aliphatic hydrocarbons. Examples of aromatic hydrocarbons are toluene, xylene and cumene, and examples of aliphatic hydrocarbons are octane, decane and petroleum ethers of various boiling fractions.

In particular, toluene, xylene or petroleum ethers of various boiling fractions are preferably used.

The chemical reactions underlying the process of this invention proceed in accordance with the following equations:

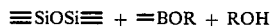

In these reactions, the volatile components, i.e., the boric acid esters and the alcohols, are removed from the reaction mixture by distillation.

The reaction is preferably carried out at atmospheric pressure, i.e., at 1020 hPa (abs.) or at approximately 1020 hPa (abs.). However, it is also possible to use higher and lower pressures.

The organopolysilanes prepared according to this invention are used in processes for preparing SiC-containing ceramic material.

Thus, they are employed in processes for the preparation of protective coatings based on silicon carbide. These coatings on metallic and nonmetallic surfaces are thermally and chemically stable.

In a preferred process for preparing protective coatings based on silicon carbide, organopolysilanes prepared according to this invention are applied to the substrate to be protected and then reacted under an inert atmosphere at temperatures in the range of from 700° to 1,500° C. or under a reactive atmosphere at temperatures of from 200° to 700° C.

By inert atmosphere, we mean inert gases such as argon or nitrogen or a vacuum; whereas, a reactive atmosphere represents air- or oxygen-containing gas mixtures.

Preferred temperatures in an inert atmosphere are in the range of from 900° to 1,300° C., and preferred temperatures in a reactive atmosphere are in the range of from 250 to 600° C.

The coating can be applied in any manner which is suitable for the application of liquid or pasty substances onto substrates, for example, by dipping, spraying, brushing, pouring or rolling.

After application, the coating is preferably dried for from 15 minutes to 2 hours at preferred temperatures of from 10° to 200° C. in an inert or reactive atmosphere.

Preferred starting materials for protective coatings based on silicon carbide contain the following components:

10 to 80 percent by weight, preferably from 20 to 50 percent by weight of SiC powder having an average grain size distribution of from 0.1 to 20 μm, and more preferably from 0.3 to 5 μm;

10 to 80 percent by weight, preferably from 15 to 60 percent by weight of organic solvent; and from 10 to 80 percent by weight, preferably from 15 to 40 percent by weight of the organopolysilane prepared in accordance with this invention.

The percent by weight relates to the total weight of the formulation for the protective coating. The solvents are preferably aromatic and aliphatic hydrocarbons, such as toluene, xylene and petroleum ethers having various boiling fractions.

The protective coatings prepared in accordance with the invention preferably have a thickness of from 2 to 2,000 μm, and more preferably from 2 to 50 μm. They are used, in particular, for producing thermally and chemically stable surface coatings on metals, ceramics, glass ceramics, fiber materials and carbon. Oxidation protection of CFC (carbon fiber-reinforced carbon) and graphite, surface sealing of porous ceramic or fiber materials and corrosion protection of metals, such as iron, steel and copper, are particularly important.

The organopolysilanes prepared in accordance with the invention are furthermore employed in processes for the production of SiC fibers. Silicon carbide fibers and processes for their production from organometallic polymers are known. They are produced from polysilanes, polycarbosilanes and polysilazanes. Spinning of a suitable polymer with subsequent pyrolysis under an inert gas or in vacuo is common to all the processes.

In a preferred process for the production of SiC fibers, organopolysilanes prepared in accordance with this invention are spun into fibers and reacted under an inert atmosphere or in vacuo at temperatures in the range of from 800° to 1,300° C.

Preferred temperatures are in the range of from 1,000° to 1,150° C. and preferred inert gases are argon and nitrogen.

The spinning into fibers is carried out by known processes, such as by dry spinning, wet spinning or melt spinning, but preferably by melt spinning. In this case, fibers preferably having an average diameter of from 5–300 μm are spun from the melt and crosslinked by exposure to heat, light, such as, for example, UV light, steam and/or oxygen, but in particular, air. The crosslinked fibers can be drawn under an inert gas or air at temperatures of from 50° to 400° C.

In the process for preparing SiC fibers, it is possible to add 0.1 to 30 percent by weight (based on the organopolysilane employed), preferably 1 to 10 percent by weight, of a compound of the formula $$R^7O[(R^7O)_2TiO]_sTi(OR^7)_3, \quad (IV)$$

where $R^7$ represents an alkyl radical and s is within the limits of from 1 to 1,000, to the organopolysilanes prepared in accordance with this invention.

The preparation of the compounds of formula IV is known and described, for example, in D. C. Bradley, R. C. Mehrotra and D. P. Gaur, Metal Alkoxides, Academic Press Inc., London, 1978.

A preferred example of the radical represented by $R^7$ of formula IV is the butyl radical.

In the addition of the compounds of formula IV, the organopolysilane is dissolved in an organic solvent and the compound of formula IV is added, and then the solvent is removed. Preferred solvents are aromatic or aliphatic hydrocarbons, such as toluene, xylene and petroleum ethers having various boiling fractions, in preferred amounts of from 1 to 99 percent by weight (based on the weight of the organopolysilane employed), and more preferably from 30 to 60 percent by weight. The solvents are preferably removed at temperatures in the range of from 100° to 230° C. and pressures in the range of from 0.1 to 10 hPa.

Silicon carbide fibers are used primarily in fiber composite materials, preferably metals such as aluminum and titanium, or ceramic materials such as silicon carbide.

The organopolysilanes prepared in accordance with this invention are employed in processes for the preparation of porous silicon carbide ceramics.

In a preferred process for the preparation of porous SiC ceramics, organopolysilanes prepared in accordance with this invention are mixed with SiC powder, compression-molded to form moldings, and reacted under an inert atmosphere or in vacuo at temperatures in the range of from 700° to 2,200° C.

Preferred temperatures are in the range of from 900° to 1,500° C. and preferred SiC powders have an average grain size of from 0.1 to 100 μm, and more preferably from 0.4 to 50 μm. Preferably from 25 to 95 percent by weight (based on the weight of the organopolysilane employed), and more preferably from 50 to 80 percent by weight, of SiC powder is preferably used.

Compression-molding additives, and in particular flow additives, are preferably added to the mixture, comprising organopolysilane and SiC powder, in amounts of from 0.01 to 5 percent by weight (based on the SiC powder employed), and more preferably from 0.2 to 1 percent by weight. Flow additives are described, for example, in Aldinger, Kalz; Angew. Chemie 5, 381, 1987. Examples of flow additives are glycerol, ammonium stearate and polyethylene glycols.

In mixing the organopolysilane with the SiC powder, and if appropriate, with the compression-molding additive, the organopolysilane is preferably dissolved in an organic solvent and mixed with the other components. Preferred solvents are aromatic or aliphatic hydrocarbons, such as toluene, xylene and petroleum ethers having various boiling fractions, in preferred amounts of from 10 to 99 percent by weight (based on the mixture), and more preferably from 35 to 55 percent by weight. The solvent is subsequently removed, preferably at temperatures of from 50° to 200° C. and pressures of from 0.1 to 10 hPa. The residue remaining is comminuted and sieved. The powder thus obtained, preferably having a maximum grain size of 500 μm, and more preferably 200 μm, is compression-molded using a press, if appropriate under elevated temperature, to form a mold. This can take place under an inert gas, air or in vacuo.

The porous silicon ceramics of this invention are employed, in particular, in filter technology. The pore sizes and pore size distribution in the ceramics can be adjusted through the grain sizes and the grain size distribution of the SiC powder employed and also by the SiC powder: organopolysilane ratios. One of the advantages of SiC filter plates is that organic filter residues can easily be removed by oxidation without the ceramic filters being destroyed at the same time.

EXAMPLE 1

Preparation of an organomethoxypolysilane solution:

A mixture containing 940 g of 1,1,2-trimethyltrimethoxydisilane and 60 g of 1,1,2,2-tetramethoxydimethyldimethyldisilane is warmed from 25° C. to 90° C. after the addition of 3 g of sodium methylate. The mixture was subsequently warmed to 170° C., while distilling off 755 g of a mixture of methyltrimethoxysilane and dimethyldimethoxysilane. A residue of 245 g was dissolved in 420 g of petroleum ether having a boiling range of from 170° to 200° C.

The following reactions were carried out in a procedure analogous to that described above, where the figures under A represent the Experimental number, those under B represent the grams of 1,1,2-trimethyltrimethoxydisilane, those under C represent the grams of 1,1,2,2-tetramethoxydimethyldisilane, those under D represent the grams of sodium methylate, those under E represent the reaction temperature in ° C., those under F represent the grams of distillate, those under G represent the grams of residue, and those under H represent the grams of petroleum ether.

| A    | B    | C   | D   | E   | F   | G   | H   |
|------|------|-----|-----|-----|-----|-----|-----|
| 1/1  | 1000 | 0   | 1   | 200 | 680 | 320 | 320 |
| 1/2  | 1000 | 0   | 2   | 170 | 740 | 260 | 260 |
| 1/3  | 1000 | 0   | 2   | 150 | 720 | 280 | 280 |
| 1/4  | 960  | 40  | 2.5 | 150 | 730 | 270 | 270 |
| 1/5  | 960  | 40  | 2.5 | 180 | 755 | 245 | 245 |
| 1/7  | 900  | 100 | 2.5 | 150 | 735 | 265 | 265 |
| 1/8  | 900  | 100 | 1   | 180 | 690 | 310 | 310 |
| 1/9  | 600  | 400 | 2.5 | 150 | 760 | 240 | 240 |
| 1/10 | 600  | 400 | 2   | 150 | 740 | 260 | 260 |
| 1/11 | 600  | 400 | 2   | 170 | 755 | 245 | 245 |

EXAMPLE 2

Preparation of an organoethoxypolysilane solution:

A mixture containing 140 g of 1,1,2-trimethyltriethoxydisilane and 140 g of 1,1,2,2-tetraethoxydimethyldisilane is warmed from 25° C. to 80° C. after addition of 1.5 g of sodium methylate. The mixture was subsequently warmed to 180° C., while distilling off 190 g of a mixture of methyltriethoxysilane and dimethyldiethoxysilane. A residue of 90 g was dissolved in 90 g of petroleum ether having a boiling range of from 170° to 200° C.

EXAMPLE 3

About 6 g of boric acid (high purity, crystalline) were added to 450 g of a polysilane solution as in Example 1, and the mixture was slowly warmed to the reflux temperature and kept at this temperature for 3 hours. At the same time, 150 g of distillate, containing methyl borate, methanol and petroleum ether, were slowly distilled off. After removal of the solvent at 160° C. and 0.8 hPa, an organopolysilane having a softening point of 80° C. was obtained.

The following reactions were carried out in a procedure analogous to that described above, in which the figures under A represent the experimental number, those under B represent the grams of organopolysilane employed, those under C represent the serial number of the polysilane solution, those under D represent the grams of boric acid, those under E represent the grams of distillate, and those under F represent the softening point in °C.

| A | B | C | D | E | F |
|---|---|---|---|---|---|
| 3/1 | 300 | 1/1 | 6 | 100 | 85 |
| 3/2 | 480 | 1/5 | 12 | 150 | 120 |
| 3/3 | 510 | 1/8 | 16 | 170 | 95 |
| 3/4 | 400 | 1/11 | 13 | 130 | >260 |
| 3/5 | 300 | 1/8 | 6 | 100 | 85 |
| 3/6 | 390 | 1/7 | 16 | 130 | 175 |
| 3/7 | 690 | 1/2 | 14 | 230 | 110 |
| 3/8 | 690 | 1/2 | 10 | 230 | 100 |
| 3/9 | 590 | 1/2 | 6 | 200 | 90 |
| 3/10 | 540 | 1/2 | 4 | 180 | 110 |
| 3/11 | 790 | 1/7 | 10 | 260 | 90 |
| 3/12 | 1800 | 1/7 | 18 | 600 | 60 |

EXAMPLE 4

About 4.6 g of methyldimethoxyvinylsilane and 3 g of boric acid (high purity, crystalline) were added to 85 g of an organopolysilane solution as in Example 2, and the mixture was slowly warmed to the reflux temperature and kept at this temperature for 20 hours. At the same time, 30 g of distillate, containing boric acid esters, the corresponding alcohols and petroleum ethers, were slowly removed. After removal of the solvent at 150° C. and at 0.2 hPa, 35 g of an organopolysilane having a softening point of >260° C. were obtained.

EXAMPLE 5

About 40 g of methyldimethoxyphenylsilane and 15 g of boric acid (high purity, crystalline) were added to 510 g of an organopolysilane solution prepared in accordance with Example 1, and the mixture was slowly warmed to reflux temperature and kept at this temperature for 5 hours. At the same time, 150 g of distillate, containing methyl borate, methanol and petroleum ether, were slowly removed. After removal of the solvent at 170° C. and at 0.2 hPa, 175 g of an organopolysilane having a softening point of 70° C. were obtained.

EXAMPLE 6

About 30 g of methyldimethoxyvinylsilane, 30 g of methyldimethoxyphenylsilane and 25 g of boric acid (high purity, crystalline) were added to 530 g of an organopolysilane solution prepared in accordance with Example 1, and the mixture was slowly heated to the reflux temperature and kept at this temperature for 2 hours. At the same time, 170 g of distillate, containing methyl borate, methanol and petroleum ether, were slowly removed. After removal of the solvent at 170° C. and at 0.8 hPa, 155 g of an organopolysilane having a softening point of 60° C. were obtained.

The following reactions were carried out in a procedure analogous to that described above, in which the figures under A represent the experimental number, those under B represent the grams of organopolysilane employed, those under C represent the experimental number of the polysilane solution, those under D represent the grams of boric acid, those under E represent the grams of methyldimethoxyvinyl silane, those under F represent the grams of methyldimethoxyphenylsilane, those under G represent the grams of distillate, and those under H represent the softening point in ° C.

| A | B | C | D | E | F | G | H |
|---|---|---|---|---|---|---|---|
| 6/1 | 620 | 1/3 | 15 | 30 | 0 | 170 | 105 |
| 6/2 | 620 | 1/3 | 15 | 50 | 0 | 180 | 120 |
| 6/3 | 630 | 1/3 | 10 | 50 | 0 | 180 | 65 |
| 6/4 | 610 | 1/4 | 15 | 60 | 0 | 170 | 55 |
| 6/5 | 710 | 1/4 | 45 | 75 | 0 | 220 | >260 |
| 6/6 | 1600 | 1/11 | 60 | 120 | 0 | 500 | >260 |
| 6/7 | 520 | 1/10 | 15 | 50 | 0 | 150 | 130 |
| 6/8 | 590 | 1/9 | 15 | 50 | 0 | 200 | 105 |
| 6/9 | 620 | 1 | 20 | 25 | 0 | 190 | >260 |

EXAMPLE 7

About 6 g of polytitanium butylate were added to 120 g of an organopolysilane prepared in accordance with Examples 3, 5 and 6, and having a softening point in the range of from 60° to 110° C., in 120 g of petroleum ether having boiling fraction of from 170° to 200° C., and the mixture was subsequently heated at 110° C. for 30 minutes. The solvent was subsequently removed at 170° C. and at 0.2 hPe. The polymers thus obtained were soluble in organic solvents and had a softening point in the range of from 80° to 130° C. These polymers were spun at 140° to 170° C. and at an argon pressure of 0.6 to MPa in a melt-spinning machine equipped with a 300 μm nozzle, the draw-off speed being in the range of from 15 to 100 m/min. On emergence from the spinning nozzle, the fibers were blue-gray and non-transparent. The fibers were then stored for 24 hours in light and air, during which time they became colorless and transparent. The fibers thus obtained exhibited good tear strength and flexibility. These fibers were heated to 1,200° C. under argon and kept at this temperature for 20 minutes. SiC. fibers of good flexibility and tensile strength were obtained.

EXAMPLE 8

About 200 g of petroleum ether having boiling fractions of from 170° to 200° C., 0.5 g of ammonium stearate, 0.5 g of glycerol and 160 g of silicon carbide powder were added to 100 g of an organopolysilane prepared in accordance with Examples 3, 4, 5 and 6, and the resultant mixture was stirred vigorously. The solvent was subsequently removed at 18020 C. and at 0.2 hPa, and the solid residue was comminuted in a mill. The powder thus obtained, having a maximum particle size of 200 μm, was transferred into a compression mold and compression-molded at a pressure of 600 kNewton for 20 seconds. These moldings were subsequently heated at 1,300° C. in an argon-flushed furnace and kept at this temperature for 90 minutes. The ceramic plates produced by this method had a density of 1.5 to 1.9 g/cm$^3$ and high strength.

EXAMPLE 9

About 160 g of an organopolysilane prepared in accordance with Examples 3, 4, 5 and 6 were mixed with 250 g of petroleum ether having boiling fractions of from 170° to 200° C. and 75 g of silicon carbide powder having a maximum particle size of 20 μm, and the mixture was stirred vigorously. This mixture is suitable for application by spraying, brushing, dipping or knife coating. Test specimens made of CFC (carbon fiber-reinforced carbon) or graphite were coated with this composition and heated at 1,100° C. in an argon-flushed furnace and kept at this temperature for 1.5 hours. After cooling, uniform, highly adherent silicon carbide coatings were formed on the specimens.

EXAMPLE 10

Example 9 was repeated, except that iron, steel and copper test specimens were substituted for CFC or graphite test specimens, and the pyrolysis temperature was 800° C. After cooling, uniform, highly adherent silicon carbide coatings were obtained.

EXAMPLE 11

Examples 9 and 10 were repeated, except that the heating was carried out to 300° C. under air at a heating rate of 1° C./min. After cooling, uniform, crack-free, highly adherent, hydrophobic, elastic coatings were formed on the test specimens.

What is claimed is;

1. A process for preparing organopolysilanes, which comprises reacting an organosilicon compound containing an Si—Si bond and having the general formula $$[-(Si)_x(Si)_y(Si)_z]_n,$$
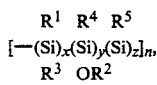

where $R^1$, $R^3$, $R^4$ and $R^5$ are each selected from the group consisting of hydrogen, an alkyl, alkenyl, aryl and alkoxy radical, $R^2$ is selected from the group consisting of hydrogen and an alkyl radical, x is in the range of from 0.1 to 0.9, y is in the range of from 0.01 to 0.5, z is in the range of from 0 to 0.5 n is in the range of from 2 to 1,000, with the proviso that the sum of (x+y+z) is 1, with boric acid.

2. The process of claim 1, wherein the reaction is carried out at a temperature in the range of from 20° to 250° C.

3. The process of claim 1, wherein from 0.1 to 20 percent by weight of boric acid, based on the weight of the organosilicon compound containing an Si—Si bond, is used.

4. The process of claim 2, wherein from 0.1 to 20 percent by weight of boric acid, based on the weight of the organosilicon compound containing an Si—Si bond, is used.

5. The process of claim 1, wherein the organosilicon compound containing an Si—Si bond is represented by the general formula $$[(SiMe_2)_a(MeSiOR^6)_b(SiMe)_c]_n, \quad (II)$$

where $R^6$ is selected from the group consisting of a methyl and ethyl radical, a:c is in the range of from 5:3 to 3:5, Me:$R^6$O is in the range of from 8:1 to 25:1 and n is in the range of from 2 to 50, and the sum (a+b+c) is 1.

6. The process of claim 2, wherein the organosilicon compound containing an Si—Si bond is represented by the general formula $$[(SiMe_2)_a(MeSiOR^6)_b(SiMe)_c]_n, \quad (II)$$

where $R^6$ is selected from the group consisting of a methyl and ethyl radical, a:c is in the range of from 5:3 to 3:5, Me:$R^6$O is in the range of from 8:1 to 25:1 and n is from 2 to 50, and the sum (a+b+c) is 1.

7. The process of claim 3, wherein the organosilicon compound containing an Si—Si bond is represented by the general formula $$[(SiMe_2)_a(MeSiOR^6)_b(SiMe)_c]_n, \quad (II)$$

where $R^6$ is selected from the group consisting of a methyl and ethyl radical, a:c is in the range of from 5:3 to 3:5, Me:$R^6$O is in the range of from 8:1 to 25:1 and n is in the range of from 2 to 50, and the sum (a+b+c) is 1.

8. The process of claim 1, wherein an organosilicon compound of the formula $$R^2O-\underset{\underset{R^3}{|}}{\overset{\overset{R^1}{|}}{Si}}-OR^2, \quad (III)$$

is added to the organosilicon compound containing an Si—Si bond, where $R^1$ and $R^3$ are each selected from the group consisting of hydrogen, an alkyl, alkenyl, aryl and alkoxy radical and $R^2$ is selected from the group consisting of hydrogen and an alkyl radical.

9. The process of claim 2, wherein an organosilicon compound of the formula $$R^2O-\underset{\underset{R^3}{|}}{\overset{\overset{R^1}{|}}{Si}}-OR^2, \quad (III)$$

is added to the organosilicon compound containing an Si—Si bond, wher $R^1$ and $R^3$ are each selected from the group consisting of hydrogen, an alkyl, alkenyl, aryl and alkoxy radical and $R^2$ is selected from the group consisting of hydrogen and an alkyl radical.

10. The process of claim 3, wherein an organosilicon compound of the formula $$R^2O-\underset{\underset{R^3}{|}}{\overset{\overset{R^1}{|}}{Si}}-OR^2, \quad (III)$$

is added to the organosilicon compound containing an Si—Si bond, where $R^1$ and $R^3$ are each selected from the group consisting of hydrogen, an alkyl, alkenyl, aryl and alkoxy radical and $R^2$ is selected from the group consisting of hydrogen and an alkyl radical.

11. The process of claim 5, wherein an organosilicon compound of the formula $$R^2O-\underset{\underset{R^3}{|}}{\overset{\overset{R^1}{|}}{Si}}-OR^2, \quad (III)$$

is added to the organosilicon compound containing an Si—Si bond, where $R^1$ and $R^3$ are each selected from the group consisting of hydrogen, an alkyl, alkenyl, aryl and alkoxy radical and $R^2$ is selected from the group consisting of hydrogen and an alkyl radical.

12. The process of claim 1, wherein from 0.1 to 40 percent by weight of an organosilicon compound of the formula

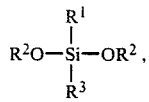
(III)

is added to the organosilicon compound containing an Si—Si bond, based on the weight of the organosilicon compound contiang an Si—Si bond, in which $R^1$ and $R^3$ are each selected from the group consisting of hydrogen, an alkyl, alkenyl, aryl and alkoxy radical and $R^2$ is selected from the group consisting of hydrogen and an alkyl radical.

13. The process of claim 2, wherein from 0.1 to 40 percent by weight of an organosilicon compound of the formula

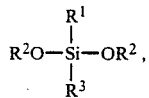
(III)

is added to the organosilicon compound containing an Si—Si bond, based on the weight of the organosilicon compound containing an Si—Si bond, in which $R^1$ and $R^3$ are each selected from the group consisting of hydrogen, an alkyl, alkenyl, aryl and alkoxy radical and $R^2$ is selected from the group consisting of hydrogen and an alkyl radical.

14. The process of claim 3, wherein from 0.1 to 40 percent by weight of an organosilicon compound of the formula

is added to the organosilicon compound containing an Si—Si bond, based on the weight of the organosilicon compound containing an Si—Si bond, in which $R^1$ and $R^3$ are each selected from the group consisting of hydrogen, an alkyl, alkenyl, aryl and alkoxy radical and $R^2$ is selected from the group consisting of hydrogen and an alkyl radical.

15. The process of claim 5, wherein from 0.1 to 40 percent by weight of an organosilicon compound of the formula

is added to the organosilicon compound containing an Si—Si bond, based on the weight of the organosilicon compound containing an Si—Si bond, in which $R^1$ and $R^3$ are each selected from the group consisting of hydrogen, an alkyl, alkenyl, aryl and alkoxy radical and $R^2$ is selected from the group consisting of hydrogen and an alkyl radical.

16. The process of claim 8, wherein from 0.1 to 40 percent by weight of an organosilicon compound of the formula

is added to the organosilicon compound containing an Si—Si bond, based on the weight of the organosilicon compound containing an Si—Si bond, in which $R^1$ and $R^3$ are each selected from the group consisting of hydrogen, an alkyl, alkenyl, aryl and alkoxy radical and $R^2$ is selected from the group consisting of hydrogen and an alkyl radical.

* * * * *